United States Patent [19]
Fukanuma et al.

[11] Patent Number: 5,366,357
[45] Date of Patent: Nov. 22, 1994

[54] SCROLL TYPE COMPRESSOR HAVING A COUNTERWEIGHT MOUNTED WITH A CLEARANCE ON A DRIVESHAFT

[75] Inventors: Tetsuhiko Fukanuma; Shinya Yamamoto; Masao Iguchi; Kiyohiro Yamada; Kunifumi Goto; Tetsuo Yoshida; Tetsuya Yamaguchi; Tatsushi Mori; Kazuhiro Kuroki, all of Kariya, Japan

[73] Assignee: Kabushiki Kaisha Toyoda Jidoshokki Seisakusho, Kariya, Japan

[21] Appl. No.: 152,825

[22] Filed: Nov. 12, 1993

Related U.S. Application Data

[63] Continuation-in-part of Ser. No. 21,760, Feb. 24, 1993, abandoned.

[30] Foreign Application Priority Data

Feb. 28, 1992 [JP] Japan ................................. 4-43621
Nov. 13, 1992 [JP] Japan ............................... 4-303475

[51] Int. Cl.⁵ ........................ F04C 18/04; F04C 29/02
[52] U.S. Cl. ................................. 418/55.1; 418/55.5; 418/55.6; 418/57; 418/151
[58] Field of Search ............... 418/55.1, 55.5, 55.6, 418/57, 151

[56] References Cited

U.S. PATENT DOCUMENTS

| | | | |
|---|---|---|---|
| 4,824,346 | 4/1989 | Hiraga et al. | 418/55.5 |
| 4,954,057 | 9/1990 | Caillat et al. | 418/55.6 |
| 5,040,958 | 8/1991 | Arata et al. | 418/151 |
| 5,199,862 | 4/1993 | Kondo et al. | 418/55.1 |

FOREIGN PATENT DOCUMENTS 57-83291 5/1982 Japan.
61-261688 11/1986 Japan.
2176179 7/1990 Japan.

Primary Examiner—John J. Vrablik
Attorney, Agent, or Firm—Brooks Haidt Haffner & Delahunty

[57] ABSTRACT

The scroll type compressor includes a stationary and orbiting scroll members, of which the spiral elements are interfit at an offset angle to form line contacts defining at least one fluid pocket, and an anti-spin mechanism for causing the orbiting member to orbit within the stationary member. A drive shaft is rotatably supported in a housing, and has an outer end a cylindrical inner end and, depending upon the embodiment, either a crank pin or a sliding guide portion projecting axially inward from its inner end. A drive bush couples the drive shaft to the orbiting scroll member, and has either a circular aperture for receiving the crank pin or an engaging slotted recess for receiving the sliding guide portion, as the case may be, whereby the drive bush is either pivotable or slidable with respect to the drive shaft. A counterweight is mounted on either the crank pin or the sliding guide portion between the drive bush and the drive shaft, and is coupled to the drive bush for conjoint movement therewith. The counterweight has a cylindrical recess for receiving the cylindrical inner end of the drive shaft, with a clearance maintained between the radially inner perimeter of the recess and the radially outer perimeter of the inner end of the drive shaft, so as to allow the drive bush and counterweight either to pivot relative to the crank pin or to slide relative to the sliding guide portion, depending upon the embodiment.

12 Claims, 5 Drawing Sheets

SCROLL TYPE COMPRESSOR HAVING A COUNTERWEIGHT MOUNTED WITH A CLEARANCE ON A DRIVESHAFT

This is a continuation-in-part of co-pending U.S. application Ser. No. 08/021,760 filed on Feb. 24, 1993, now abandoned, which is incorporated herein by reference. This application also claims the convention priority of Japanese Patent Application No. 4-303475 filed on Nov. 13, 1992.

BACKGROUND OF THE INVENTION

1. Field of the Invention

The present invention relates to a scroll type compressor, and more specifically, to improvements in the structure of a counterweight and a drive bush in the scroll type compressor.

2. Description of the Background Art

Publication of Unexamined Japanese Utility Model Application No. 57-83291 (1982) discloses a scroll type compressor to which the present invention pertains. According to the conventional compressor, there are provided two inter fitting scroll members each having an end plate and an involute spiral element, one scroll member being orbitable relative to the other stationary member. The scroll members are angularly offset at 180° to form line contacts between the interfitting spiral elements, thereby defining a fluid pocket or a fluid working chamber of the compressor. A drive shaft is rotatably supported in the compressor housing via a bearing, and has a crank pin disposed eccentrically and projecting axially inward from the inner end surface of the drive shaft.

The crank pin is disposed on top of a drive bush, which in turn supports the orbiting scroll member by means of a bearing. The drive bush is adapted to cooperate with an anti-spin mechanism in order to convert the rotational motion of the drive shaft into the orbital motion of the orbiting scroll member. At the same time, the bush and anti-spin mechanism prevent the orbiting scroll member from rotating on its own axis. Additionally, a counterweight for dynamically balancing the orbital motion of the orbiting scroll member is installed on the crank pin between the drive bush and the drive shaft end, and revolves together with the drive bush.

Fluid or refrigerant gas is drawn into the compressor through an inlet in the compressor housing, and is taken into the fluid pocket. The fluid or gas is next compressed when the pocket both moves toward the center of the scroll members while undergoing a reduction in it's volume. The compressed refrigerant gas is finally discharged through a discharge port formed at the center of the end plate of the stationary scroll member.

In the conventional compressor, the counterweight is connected to the drive bush by means of a rivet which is close fit through holes formed in the counterweight and the drive bush. One end of the rivet, remote from the drive bush, fits loosely into a hole formed in the drive shaft end. The loose fit results in a small clearance between the hole and accompanying rivet end which permits the drive bush to rotate with the counterweight about the crank pin only for a limited angular distance. This limited rotational movement of the drive bush about the pin allows the orbiting scroll member to compensate for possible wear or machining inaccuracies introduced in the interfitting involute surfaces of the spiral elements. Consequently, the stationary and orbiting scrolls can maintain an optimal positional relationship between themselves.

Unfortunately, due to the fact that the rivet end is loosely fit in the drive shaft end, it is subject to impact shock, torque and other rotational forces transmitted from the drive shaft to the drive bush, or vise versa, when compressor operation is started or stopped. These forces result in a shearing force being applied to the rivet. Repeated application of such forces may cause the rivet to deform or even break.

SUMMARY OF THE INVENTION

It is a primary object of the present invention, therefore, to provide an improved scroll type compressor having the drive shaft, counterweight and drive bush as separate parts. In the improved compressor, it is possible to achieve safe transmission of rotational forces produced by the coaction of a drive shaft, drive bush and counterweight.

The scroll type compressor includes a housing, a stationary scroll member disposed fixedly with respect to said housing, and an orbiting scroll member. Each of the stationary and orbiting scroll members has an end plate and an involute spiral element. The spiral elements of the scroll members are interfitted at an offset angle thereby making line contacts that define at least one fluid pocket.

The compressor further includes a drive shaft, a drive bush, a counterweight, and an anti-spin mechanism. The drive shaft is rotatably supported in the housing through a bearing, and has an outer end, and a cylindrically shaped inner end. The drive bush couples the drive shaft to the orbiting scroll member which is supported within the housing by the drive bush.

The anti-spin mechanism allows the orbiting scroll member to rotate in cooperation with the drive bush during compressor operation without the orbiting scroll rotating on its own axis.

In order to achieve the above object, there is provided a scroll type compressor wherein the drive bush and the counterweight are connected tightly for integral movement and the counterweight is formed with a cylindrical recess which is so sized to engage loosely with the cylindrical inner end of the drive shaft with a slight circumferential clearance maintained between the drive shaft end and the recess in the counterweight. The counterweight and the drive bush may be secured to each other through a cylindrical projection formed on one of the counterweight and the drive bush and close fitted in a mating cylindrical recess formed in the other of the counterweight and the drive bush. To prevent their relative movement, the projection and the recess have a common axial center which is eccentric with respect to the axial center of a crank pin over which the counterweight and the drive bush are mounted.

In the first and second embodiments of the invention, the counterweight movable integrally with the drive bush is fitted over a crank pin which projects inwardly from the inner end of the drive shaft, to permit limited rotation thereabout relative to the drive shaft. The drive bush can thus function to compensate for the orbital motion of the orbiting scroll member by taking up any possible wear and dimensional inaccuracies of the spiral elements of the scroll members.

Loose engagement of the drive shaft inner end and the counterweight with a clearance therebetween can provide a substantially large contact area between the circumferential peripheries of the recess in the counterweight and the drive shaft end which can safely receive a force exerted from the drive shaft to the counterweight, and vice versa, during starting or stopping the compressor.

In the compressor with the drive bush and the counterweight connected by means of the cylindrical projection and recess, there is no need to form the counterweight and the drive bush with aligned holes for receiving a connecting member such as a rivet, and the connection member itself can be dispersed with.

In a third embodiment of the invention, a sliding guide portion projects axially inward from the inner end of the drive shaft. The drive bush has an engaging recess for engagement with the sliding guide portion, allowing the drive bush to slide with respect to the drive shaft.--

The counterweight is mounted on the sliding guide portion between the drive bush and the inner end of the drive shaft, and is coupled to the drive bush for movement therewith to balance the centrifugal force exerted by the orbiting scroll member. As in the first and second embodiments, the counterweight has a cylindrical recess for receiving the cylindrical inner end of the drive shaft, with a clearance maintained between the radial inner perimeter of the recess and the radial outer perimeter of the drive shaft's inner end. This allows the drive bush and counterweight to slide relative to the sliding guide portion.

BRIEF DESCRIPTION OF THE DRAWINGS

The above and other objects, features and advantages of the invention will become apparent to those skilled in the art from the following description of embodiments of the scroll type compressor according to the present invention, which description is made with reference to the accompanying drawings.

FIGS. 1 through 5 show a first and second embodiments according to the parent invention of this CIP application, in which:

FIG. 1 is a longitudinal cross-sectional view of a scroll type compressor according to the first embodiment;

FIG. 2 is a cross-sectional view of a drive shaft, a counterweight and a drive bush of the compressor of FIG. 1;

FIG. 3 is a cross-section taken along line 3—3 of FIG. 2;

FIG. 4 is a cross-section similar to FIG. 3, but illustrates a condition in which the drive shaft is rotated for an angular distance from the position of FIG. 3; and FIG. 5 is a cross-sectional view similar to FIG. 2, but illustrates a second embodiment.

FIGS. 6 and 7 show a third embodiment according to the present invention, in which:

FIG. 6 is a cross-sectional view similar to FIG. 2; and

FIG. 7 is a cross-section taken along line 7—7 of FIG. 6.

FIGS. 8 and 9 show a fourth embodiment according to the present invention, in which:

FIG. 8 is a cross-sectional view similar to FIG. 2; and

FIG. 9 is a cross-section taken along line 9—9 of FIG. 7.

DETAILED DESCRIPTION OF THE PREFERRED EMBODIMENT

The following will describe the first embodiment of the scroll type compressor referring to FIGS. 1, 2, 3 and 4.

Figure 1:
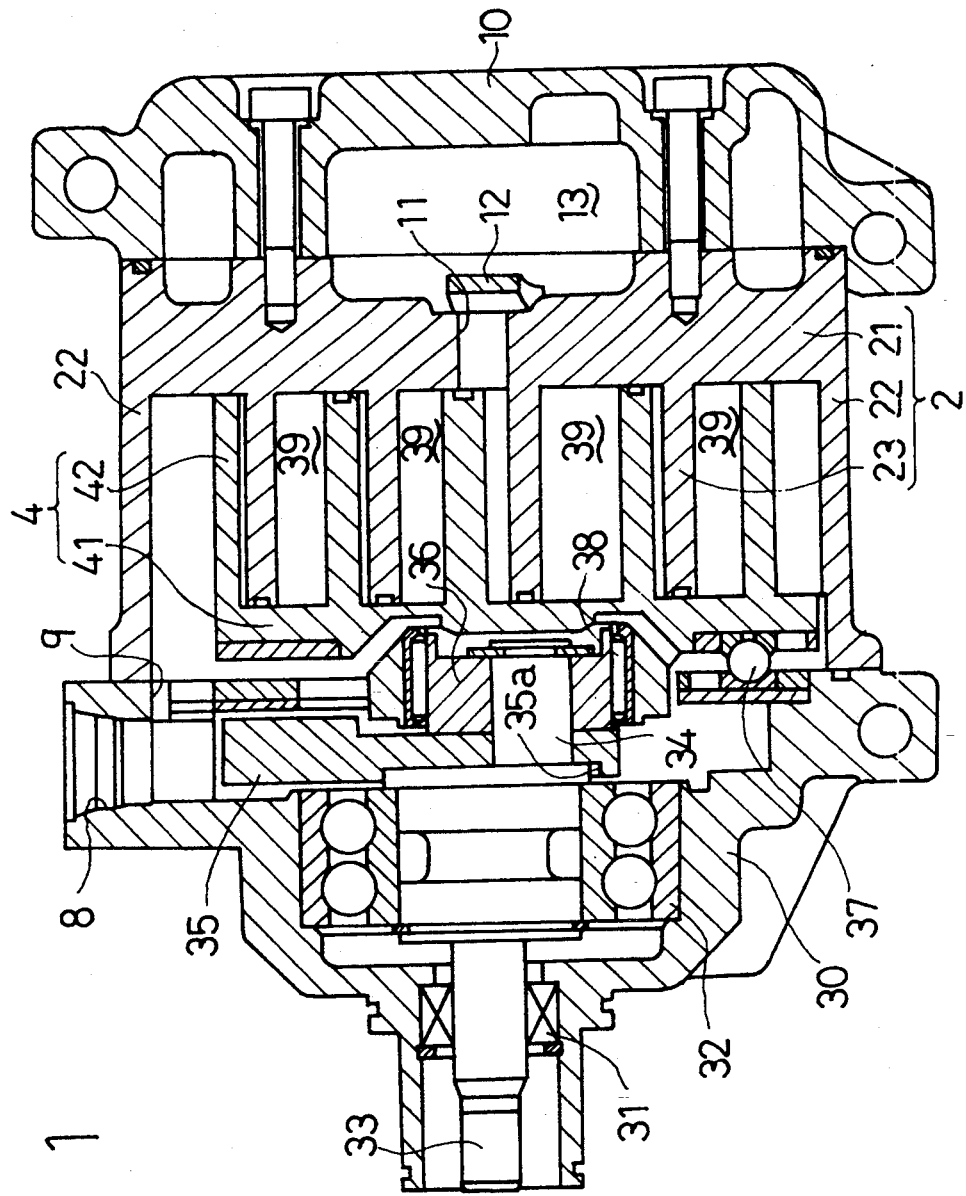

Referring to FIG. 1, the scroll type compressor includes a front housing 30, a rear housing 10, a stationary scroll member designated by reference numeral 2 and connected sealingly at the opposite ends thereof between the front and rear housings, and a movable or orbiting scroll member designated by reference numeral 4. The stationary scroll member 2 comprises an end plate 21, a shell portion 22 for the compressor formed integral with the end plate, and an involute spiral element 23 which projects axially inward from the end plate.

The orbiting scroll member 4 includes an end plate 41 and an involute spiral element 42 formed integrally with the end plate and projecting axially inward therefrom. The spiral elements 23, 42 of the two scroll members are interfit at an offset angle and thereby form a plurality of line contacts between their involute surfaces to provide sealed variable volume fluid pockets 39, i.e. fluid working chambers. These pockets or chambers are defined by the flank walls of the spiral elements 23, 42 and the end plates 21, 41 of the stationary and orbiting scroll members 2, 4.

Figure 2:
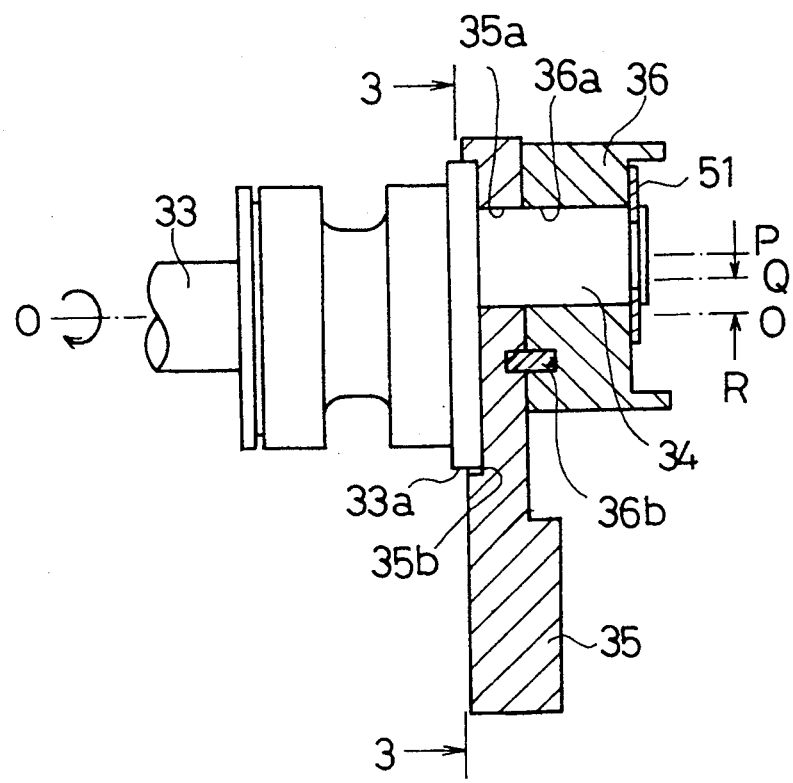

A drive shaft 33 is rotatably supported in the front housing 30 by a shaft seal 31 and a radial ball bearing 32 for rotation about its own axis, indicated by reference symbol "O " in FIG. 2. The drive shaft 33 has a cylindrical crank pin 34 projecting inward from the inner end surface thereof with its axial center "P" (FIG. 2) located eccentrically with respect to the axial center at "O". A cylindrical drive bush 36, having its axial center "Q" offset from both centers "O" and "P", is eccentrically fitted at its hole 36a over the crank pin 34, and is retained by a snap ring 51. A counterweight 35 is also fitted at its hole 35a over the crank pin 34 between the drive shaft 33 and the drive bush 36. As is known in the art, the drive bush 36 cooperates with an anti-spin mechanism 37 to support the orbiting scroll member 4 via a bearing 38 in such a way that permits the scroll member to rotate while preventing it from rotating on its own axis.

As shown in FIG. 2, the drive bush 36 has a hole on the side adjacent the drive shaft for receiving therein one end of a rivet (or a screw) 36b. The other end of the rivet 36b is received in a hole formed in the counterweight 35 so that the counterweight and the drive bush are connected together for integral movement. The arrangement and weight of counterweight 35 results in an effective balancing of the centrifugal force developed by the orbital motion of the orbiting scroll member 4.

Figure 3:
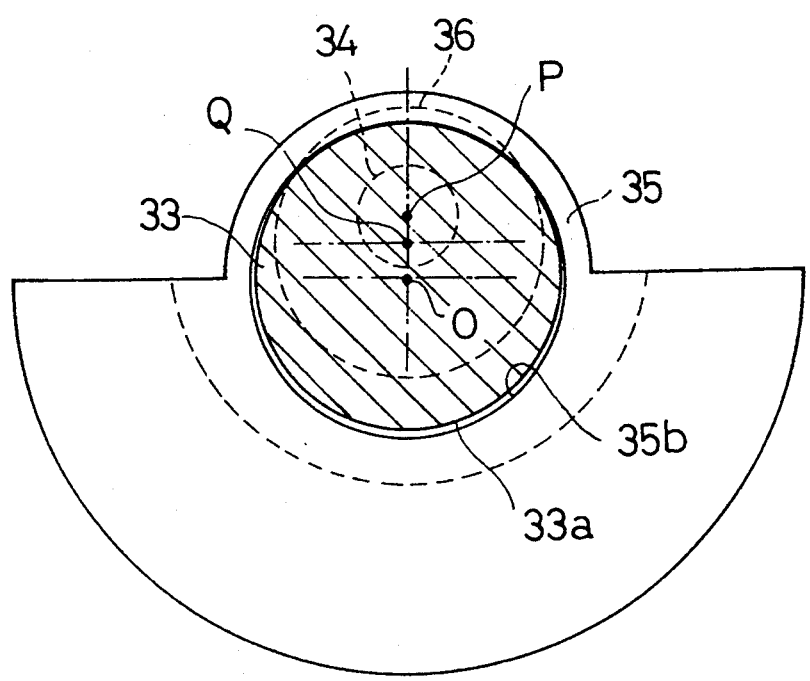
Figure 4:
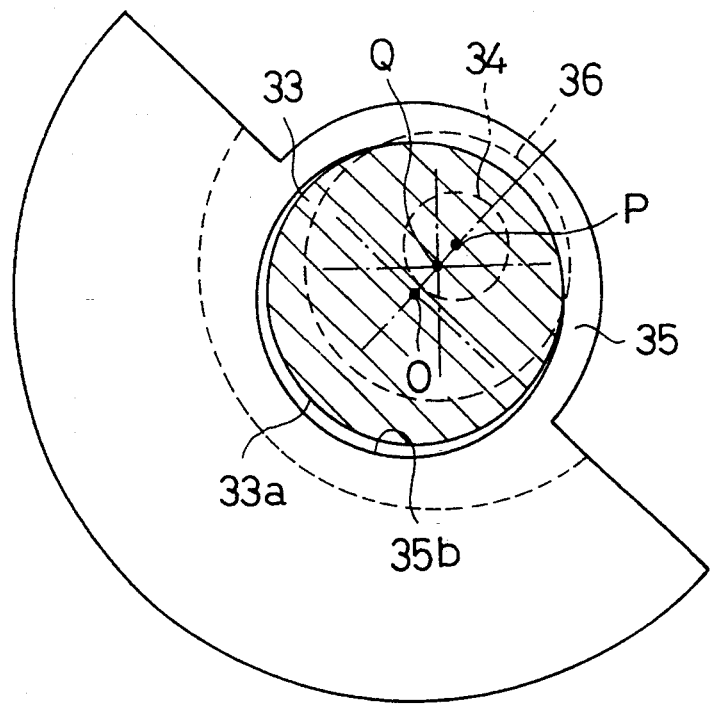

The rivet 36b extends only in the drive bush 36 and the counterweight 35, and it does not reach the drive shaft end. The counterweight 35 is provided on the surface thereof adjacent the drive shaft 33. The counterweight 35 includes a cylindrical recess 35b having its axial center located substantially in correspondence with the axial center "O" of the drive shaft 33. Counterweight 35 receives axial cylindrical end 33a of the drive shaft with a small clearance formed between the inner circumferential periphery of the recess 35b and the outer circumferential periphery of the drive shaft end 33a, as shown in FIGS. 2, 3 and 4. This clearance permits a relative rotation of the drive bush 36 about the crank pin 34, with respect to the drive shaft 33, for an angular distance limited by the clearance.

As shown in FIG. 1, the front housing 30 is provided with a refrigerant inlet 8 connected to an external refrigeration circuit (not shown) and a refrigerant passage 9 in direct communication with the interior of the shell portion 22 of the stationary scroll member 2. The end plate 21 of the stationary scroll member 2 is formed centrally with a discharge port 11 which communicates with a fluid pocket 39 when the pocket is moved to the center of the scroll members. The rear housing 10 is provided with a discharge chamber 13 defined by a wall member of the rear housing and communicable with the discharge port 11 through a check valve 12. The discharge chamber 13 is connected to the external refrigeration circuit (not shown).

As the drive shaft 33 is driven by an engine through an electromagnetic clutch (not shown), the crank pin 34 is revolved about the axial center "O" of the drive shaft. The drive bush 36, movable with the crank pin 34, cooperates with the anti-spin mechanism 37 to cause the orbiting scroll member 4 to make an orbital motion without rotating on its own axis. Refrigerant gas fed from the refrigeration circuit through the inlet 8 and the passage 9 is taken into a fluid pocket 39. As the orbiting scroll member 4 continues to orbit, the fluid pocket 39 reduces its volume while moving toward the center of the scroll members. The refrigerant gas is thus compressed at the center, and discharged into the discharge chamber 13 through the discharge port 11 while pushing open the check valve 12.

By providing the clearance between the cylindrical recess 35b in the counterweight 35 and the drive shaft end 33a, the present invention allows for the counterweight 35 and drive bush 36 to rotate about the crank pin 34 while compensating for any relatively inaccurate positions occassioned between the stationary and orbiting scroll members 2, 4. Consequently, a fluid-tight seal between the spiral elements 23 and 42 may be maintained during compressor operation.

Moreover, the impact shock, torque and other rotational forces applied to the counterweight 35 and drive bush 36 by the drive shaft 33, or vice versa, during the starting or stopping of the compressor can be safely dispersed over a substantially large contact area between the circumferential peripheries of the cylindrical recess 35b and the drive shaft end 33a. This is apparent from the illustrations in FIGS. 3 and 4 showing two different angular positions of the drive shaft 33 and its associated parts.

Thus, the scroll type compressor as described in the first embodiment of the present invention can dispense with the aforementioned conventional rivet which is susceptible to a damaging and even deforming force. Consequently, it is possible to safely transmit the engine's driving force from the drive shaft 33 to the counterweight 35 and drive bush 36 during starting and stopping operations of the compressor. This significantly enhances the durability of the compressor.

Figure 5:
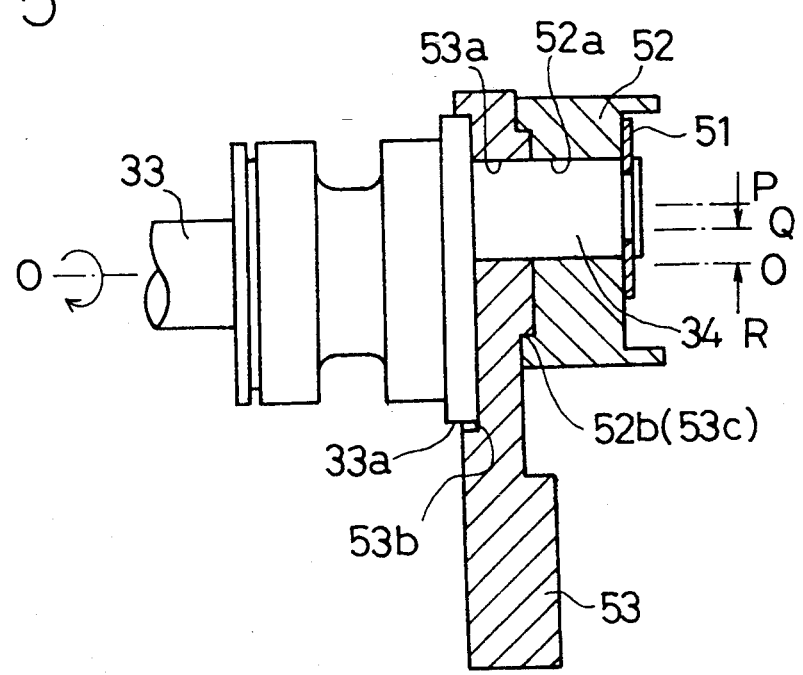

A second embodiment according to the present invention will now be explained with reference to FIG. 5. This embodiment differs from the above-described first embodiment in that the rivet 36b (FIG. 1) is omitted. Moreover, the drive bush 52 and the counterweight 53 are connected together by the combination of a cylindrical recess 52b formed in the bush and by a mating cylindrical projection 53c formed on the counterweight and close fitted in the recess. Relative movement between the drive bush 52 and the counterweight 53 can be prevented by forming these recess 52b and projection 53c with a common axial center in alignment with the axial center "Q", and offset with respect to the axial center "P" of the crank pin 34.

This immediate advantage to the construction of the present embodiment is that any rivet connecting the counterweight to the drive bush may be eliminated. In addition, there is no need to have holes in the counterweight 53 and the drive bush 52 for reception of any connection means such as rivet. This results in less manufacturing parts needed for the compressor construction and a consequent savings in the cost of compressor manufacturing.

Figure 6:
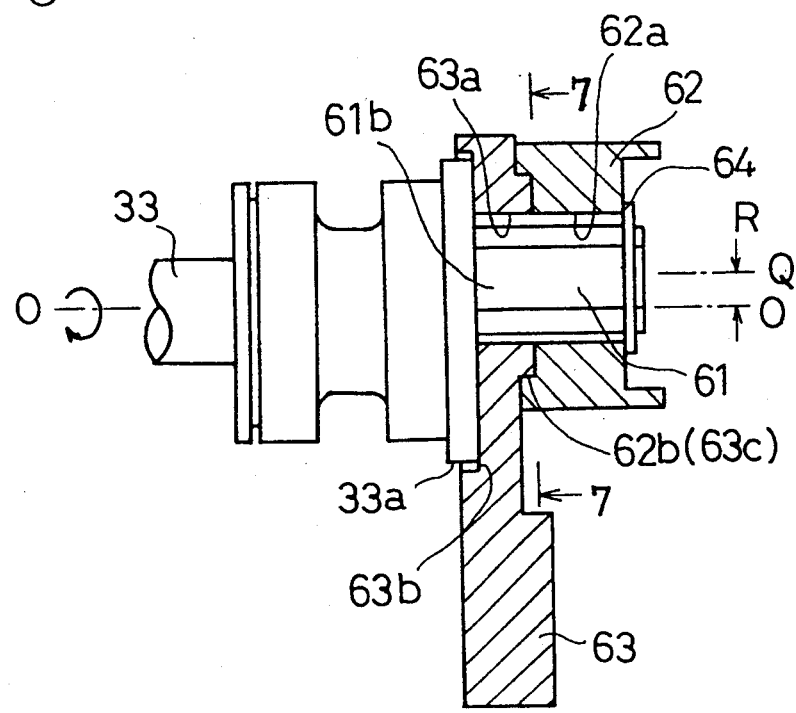
Figure 7:
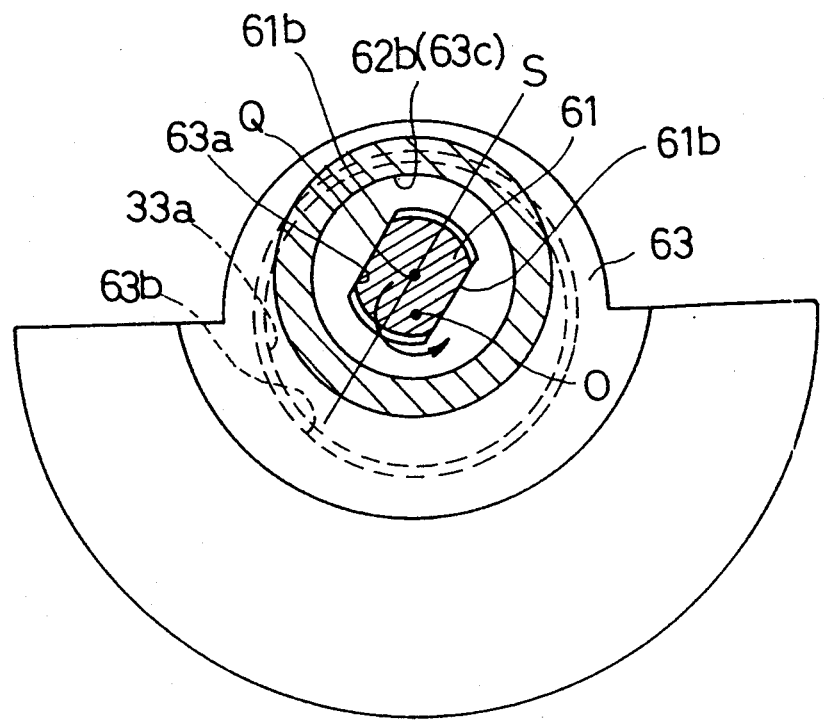

The third embodiment of the present invention will now be explained with reference to FIGS. 6 and 7. In the third embodiment, the parts described in the first and second embodiments are given similar numerical references.

A sliding-guide key 61 projects from a surface of an inner end 33a of the drive shaft 33. The sliding-guide key 61 is disposed eccentrically with respect to the axial center (O) of the drive shaft, while the axial center of the key is aligned to the axial center (Q) of the drive bush. The key 61 is formed by planing a cylindrical projection from the drive shaft inner end, and has two slide surfaces 61b. The slide surfaces 61b are parallel to an imaginary plane which includes the axis (Q) of the drive bush. The imaginary plane is inclined with respect to a second plane having both the drive bush axis (Q) and the drive shaft axis (O) included therein.

A drive bush 62 includes a guide hole 62a into which the key 61 is inserted. Similarly, counterweight 63 also includes a guide hole 63a into which the key 61 is inserted. After the key 61 is inserted into both holes 62a, 63a, a snap ring 64 is fitted to the protruding end of the key 61. According to this arrangement, the drive bush 62 is linearly and slidably mounted on the key 61. The drive bush 62 slides along the direction indicated by a line (S), as shown in FIG. 7.

A connection between the drive bush 62 and counterweight 63 is achieved by engaging a recess 62b formed in the bush 62 with a projection 63c formed on the counterweight 63. The recess 62b and projection 63c have a dish like shape where the line Q is the center of radius, similar to the second embodiment. A cylindrical recess 63b is formed at the rear surface of the counterweight 63, similar to the first and second embodiments. The cylindrical recess 63b permits the linear movement of drive shaft end 33a to correspond to the sliding motion of the drive bush 62. Other features and structures are generally similar to those of the second embodiment.

Rotation of the drive shaft 33 is transmitted to the drive bush 62, via the sliding-guide key 61. The transmitted motion is converted into orbital motion of the orbiting scroll member 4 by means of the anti-spin mechanism 37. Accordingly, the compressor can carry out the suction, compression, and discharge strokes for the refrigerant gas, in a fashion similar to that of the first embodiment.

According to the compressor of this embodiment, the drive bush 62 is permitted to slide relative to the sliding-guide key 61, along the slide direction (S) for a predetermined distance. Further, the clearance between the inner wall of the cylindrical recess 63b and the drive shaft end 33a permits both the counterweight 63 and drive bush 62 to make limited linear sliding motion with respect to the key 61. This compensates for any relatively diminutive displacement which could occur between the stationary and orbiting spiral elements 23, 42, in a fashion similar to the first embodiment.

The recess 62b and projection 63c extend perpendicularly to the sliding direction (S) of the drive bush 62 with no gap existing between the drive bush 62 and the counterweight 63. Consequently, any eccentric moment, which is transmitted from the orbiting spiral element 4 to the counterweight 63 through the drive bush 62, is effectively eliminated, similar to the second embodiment.

Figure 8:
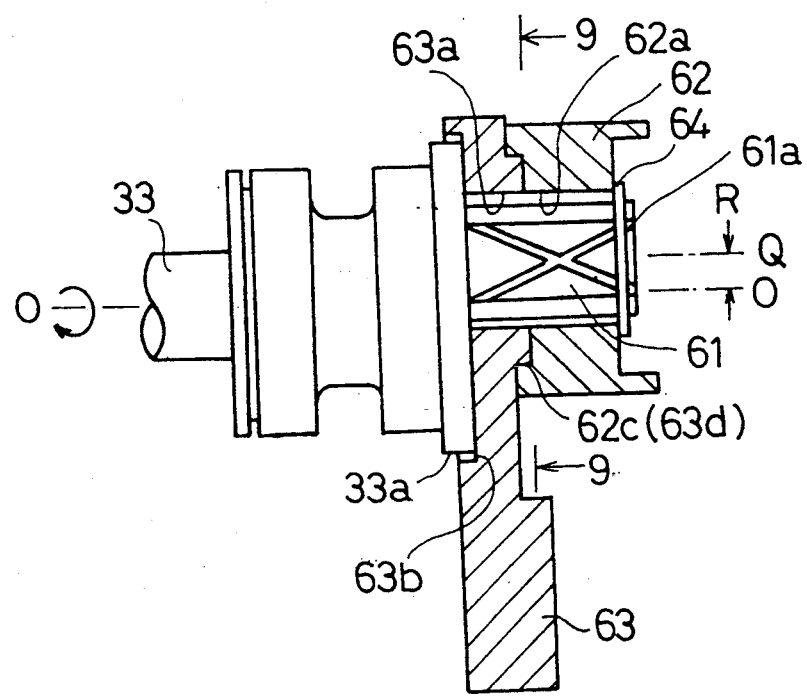
Figure 9:
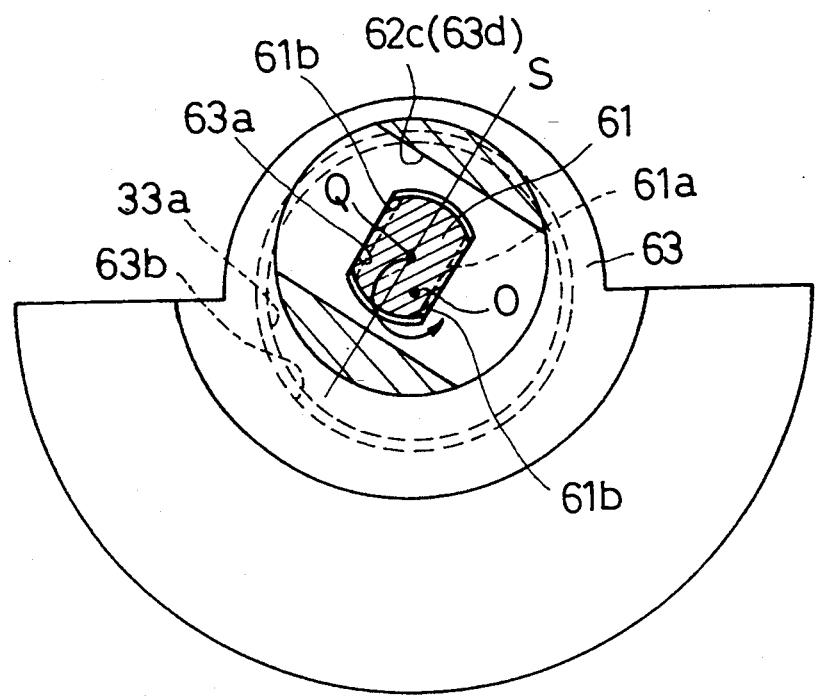

The fourth embodiment according to the present invention will now be explained with reference to FIGS. 8 and 9. The parts described in the first, second and third embodiments are given similar numerical references. Connection between the drive bush 62 and counterweight 63 is achieved by engaging recess 62c with a projection 63d. As shown in FIG. 9, the recess 62c and projection 63d have a rectangular cross-sectional shape rather than a disk like shape. These portions 62c, 63d correspond to recess 62b and projection 63c in the third embodiment respectively, and likewise achieve similar functions.

Two oil grooves 61a, which may cross with respect to each other, are formed on each slide surface 61b of the key 61. Each one of the oil grooves 61a extends from the tip portion of the key 61 to the proximal portion adjacent to the drive shaft end 33a. Each groove 61a, therefore, allows lubricant oil in the compressor to be supplied between the slide surface of the key and the drive bush 62. According to this construction, it is possible to compensate for any diminutive displacement generated between the relative positional relationship of the stationary and orbital spiral elements 23 and 42.

In view of the ease with which oil grooves can be formed on the slide surface of the sliding-guide key 61, and considering that compressors using the above described oil grooves enjoy far superior durability characteristics than do compressors having no such oil grooves, compressors utilizing the teachings of the invention according to the present embodiment offer a superior design with a low manufacturing cost compared with conventional compressors.

Although only four embodiments have been described in detail herein, it should be apparent to those skilled in the art that the present invention may be embodied in many other specific forms without departing from the spirit or scope of the invention. Particularly, it should be understood that the following modes are applied.

In the third and fourth embodiments, the first clearance between the guide holes 62a, 63a and the sliding-guide key 61 is substantially similar to the second clearance between the drive shaft end 33a and the cylindrical recess 63b. In accordance with the first and second clearances, the sliding region of the drive bush 62 and counterweight 63 is restricted. Instead of such a clearance design, the first clearance may differ in size from that of the second clearance. This would allow the sliding region to be restricted by either one of the first or second clearances.

Therefore, the present examples and embodiments are to be considered as illustrative and not restrictive and the invention is not to be limited to the details given herein, but may be modified within the scope of the appended claims.

What is claimed is:

1. A scroll type compressor comprising:
   a housing;
   a stationary scroll member disposed fixedly with respect to said housing, and having an end plate and an involute spiral element;
   an orbiting scroll member having an end plate and an involute spiral element;
   said spiral elements of the stationary and orbiting scroll members being interfitted at an offset angle to form line contacts defining at least one fluid pocket;
   a drive shaft rotatably supported in said housing through a bearing, said drive shaft having an outer end, a cylindrically shaped inner end and a sliding guide portion projecting axially inward from said inner end;
   a drive bush for coupling said drive shaft to said orbiting scroll member, which is supported within said housing by the drive bush;
   said drive bush having a engaging recess for engagement with said sliding guide portion, whereby said drive bush is slidable with respect to said drive shaft;
   an anti-spin mechanism for causing said orbiting scroll member to rotate in cooperation with said drive bush, without said orbiting scroll rotating on its own axis;
   a counterweight mounted on said sliding guide portion between said drive bush and the inner end of said drive shaft, and coupled to said drive bush for conjoint movement therewith for balancing the centrifugal force exerted by said orbiting scroll member; and
   said counterweight having a first cylindrical recess for receiving said cylindrical inner end of the drive shaft, with a clearance maintained between the radially inner perimeter of said recess and radially outer perimeter of said inner end, so as to allow said drive bush and counterweight to slide relative to said sliding guide portion.

2. The compressor according to claim 1, wherein said sliding guide portion is disposed eccentrically with respect to the axis (O) of said drive shaft, and the axis of said sliding guide portion is aligned to the axis (O) of said drive bush.

3. The compressor according to claim 1 further comprising means for coupling said drive bush with said counterweight such that they can rotate together; and wherein said coupling means includes:
   a cylindrical projection formed on one of said drive bush and said counterweight; and
   a second cylindrical recess formed in the other of said drive bush and said counterweight, corresponding to said cylindrical projection.

4. The compressor according to claim 1, wherein said sliding guide portion has two parallel slide surfaces formed thereon.

5. The compressor according to claim 4, wherein said slide surfaces are parallel to an imaginary plane including an axis (Q) of the drive bush, said plane being inclined with respect to a plane including both said drive bush axis (Q) and an axis (O) of said drive shaft.

6. The compressor according to claim 4, wherein said engaging recess of the drive bush includes two parallel inner walls in communication with said slide surfaces, respectively.

7. The compressor according to claim 4, wherein each of said slide surfaces includes at least one groove formed thereon for supplying lubricant oil.

8. The compressor according to claim 4, wherein each of said slide surfaces includes two grooves formed thereon in communication with each other, for supplying lubricant oil between said drive bush and the slide surface.

9. A scroll type compressor comprising:

a housing;

a stationary scroll member disposed fixedly with respect to said housing, and having an end plate and an involute spiral element;

an orbiting scroll member having an end plate and an involute spiral element;

said spiral elements of the stationary and orbiting scroll members being interfitted at an offset angle to form line contacts defining at least one fluid pocket;

a drive shaft rotatably supported in said housing through a bearing, said drive shaft having an outer end, an inner end and a crank pin disposed eccentrically with respect to the axis of rotation of said drive shaft and projecting axially inward from said inner end;

an anti-spin mechanism;

a drive bush fitted over the crank pin and cooperating with said anti-spin mechanism to support said orbiting scroll member in such a way that permits said orbiting scroll member to effect orbital motion without rotating on its own axis;

a counterweight mounted on said crank pin between the inner end of said drive shaft and said drive bush, and coupled to said drive bush for conjoint movement therewith for balancing the centrifugal force exerted by said orbiting scroll member;

the inner end of said drive shaft being cylindrically shaped; and said counterweight having a cylindrical recess in which said inner end of the drive shaft is loosely fitted with a clearance maintained between the radially inner perimeter of said recess and the radially outer perimeter of said inner end of the drive shaft.

10. The compressor according to claim 9, wherein the coupling between said drive bush and said counterweight is accomplished by means of a connecting member inserted through aligned holes formed in the drive bush and counterweight.

11. The compressor according to claim 10, wherein said connecting member includes a rivet.

12. The compressor according to claim 9, wherein the coupling between said counterweight and said drive bush is accomplished by a cylindrical projection formed on one of said counterweight and said drive bush and close fitted in a mating cylindrical recess formed in the other of said counterweight and said drive bush, said projection and recess having a common axial center which is eccentric with respect to the axial center of said crank pin.

* * * * *

UNITED STATES PATENT AND TRADEMARK OFFICE
CERTIFICATE OF CORRECTION

PATENT NO. : 5,366,357
DATED : November 22, 1994
INVENTOR(S) : T. Fukanuma et al It is certified that error appears in the above-indentified patent and that said Letters Patent is hereby corrected as shown below:

Column 8, line 43, "(O)" should read --(Q)--.

Signed and Sealed this

Eighteenth Day of April, 1995

Attest:

BRUCE LEHMAN

*Attesting Officer*

*Commissioner of Patents and Trademarks*